Jan. 25, 1944. R. T. PALMER 2,340,252
TEMPERING APPARATUS FOR REFRIGERATED AIR
Filed Jan. 4, 1941
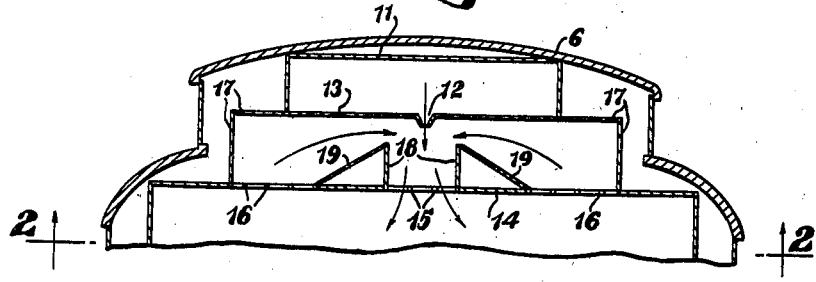
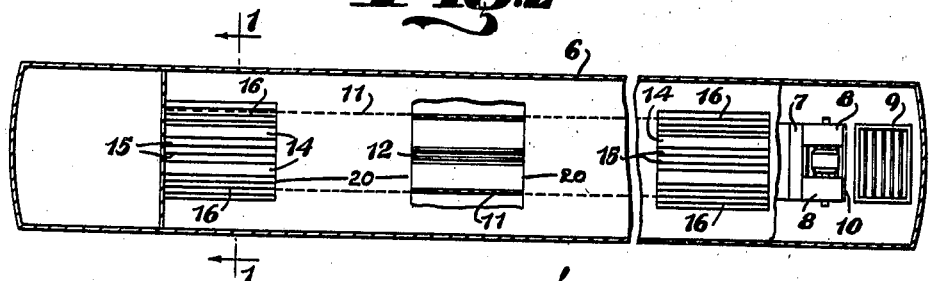
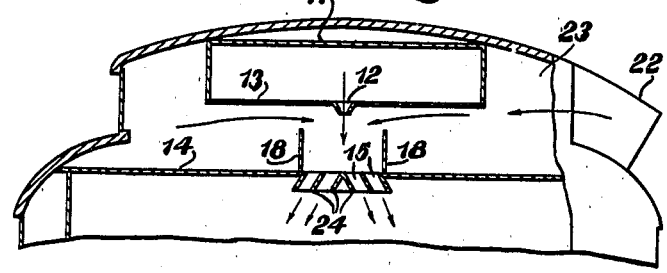
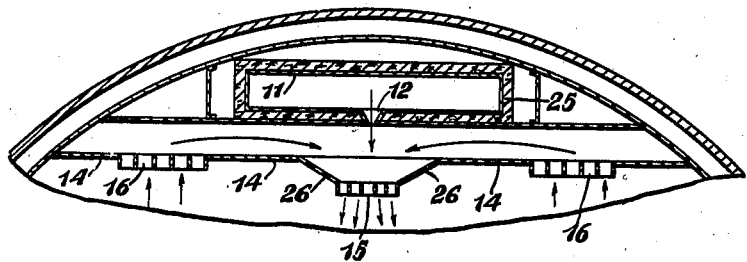
INVENTOR
Robert T. Palmer Patented Jan. 25, 1944

2,340,252

UNITED STATES PATENT OFFICE 2,340,252

TEMPERING APPARATUS FOR REFRIGERATED AIR

Robert T. Palmer, Sharon, Mass., assignor to B. F. Sturtevant Company, Boston, Mass.

Application January 4, 1941, Serial No. 373,159

9 Claims. (Cl. 98—10)

This invention relates to tempering apparatus for refrigerated air and relates more particularly to apparatus for blending warm air with air chilled to a low dew point for increasing the sensible heat thereof.

In air cooling systems in passenger vehicles such, for example, as railway passenger cars, it has been the practice in warm weather, to blow the air from the refrigerative dehumidifier directly into the passenger space without reheat and to control the temperature within the passenger space by cycling the refrigerant compressor. This has resulted during the off cycles of the compressor in rises in relative humidity due both to the absence of any dehumidification, and to the re-evaporation of moisture from the commonly used, direct expansion evaporator tubes, which was condensed thereon during the on cycles of the compressor. To overcome the rises in relative humidity, it has been proposed to operate the compressors continuously and to reheat the air before delivery by steam heaters controlled by dry bulb thermostat in the passenger space. The operating costs however of such an expedient are believed to be out of all proportion to be benefits gained.

In stationary air conditioning systems such as theaters the air is chilled to a low dew point temperature for effective dehumidification and the air is reheated by mixture with it of recirculated air known as "by-pass" air. The reissue patents, Lewis No. Re. 16,611 and Fleisher No. Re. 20,088 disclose such systems. The by-pass systems however require plenum mixing chambers, by-pass air ducts and additional fans and there is insufficient space for such equipment in railway passenger cars.

This invention provides a modified by-pass system for railway passenger cars by providing in one embodiment, ejectors in the lower wall of an overhead central duct, which induce the flow of recirculated air as by-pass air, through ceiling inlet grilles on both sides of the duct, the by-pass air being mixed with the dehumidified air prior to its discharge into the passenger space, thereby raising its sensible heat.

An object of the invention is to reheat the chilled, dehumidified air in air conditioning systems for passenger vehicles, by mixture with warm air.

Another object of the invention is to cause the chilled, dehumidified air in air conditioning systems for passenger vehicles, to induce the flow into it of warm air prior to delivery into the passenger space, for raising the sensible heat of the delivered air.

The invention will now be described with reference to the drawing of which:

Fig. 1 is a cross-section through a railway passenger car equipped with one embodiment of this invention, taken along the lines 1—1 of Fig. 2;

Fig. 2 is a plan view in section looking from the passenger space of the car of Fig. 1 and taken along the lines 2—2 of Fig. 1;

Fig. 3 is a transverse section through a railway passenger car equipped with another embodiment of the invention utilizing outdoor air as by-pass air, and Fig. 4 is a transverse section similar to Fig. 1 except that the car of Fig. 4 is a so-called "turtle back" or stream-lined car, while the car of Fig. 1 is one having a clere-story space.

Referring first to Figs. 1 and 2, the car 6 contains in one end, a conventional refrigerative dehumidifier 7 equipped with the blow-through fans 8 for drawing in outdoor air through the inlet 9, and recirculated air through the inlet 10, for passing the mixture through the dehumidifier 7, and for forcing the dehumidified air under pressure into the overhead centrally placed duct 11.

The duct 11 is provided, for example, with a plurality of slits 12 in its lower wall 13, the slits each being, for example, five feet long and four in number and spaced apart equal distances. The ceiling 14 contains below the slits 12, the air outlet grilles 15 through which the conditioned air is discharged into the passenger space. The recirculated air inlet grilles 16 are placed in the ceiling 14 on opposite sides of the outlet grilles 15.

The outer longitudinal sides of the grilles 16 are connected to the adjacent lower edges of the duct 11 by the air guiding partitions 17. The vertical partitions 18 extend upwardly from the outer longitudinal sides of the outlet grilles to points between the outlet grilles and the slits 12 and provide a confined passage for the production of an inducing effect by the jets discharged by the slits 12, and for the mixing of the recirculated air drawn in through the inlet grilles 16 by the ejector action as will be explained in more detail. The inclined partitions 19 connect the inner longitudinal sides of the grilles 16 and the upper edges of the vertical partitions 18 and serve to guide the recirculated air smoothly into the upper end of the passage between the partitions 18.

The transverse sides of the grilles 15 and 16 are formed by the common walls 20 which with the partitions 17, the lower wall 13 of the duct 11, the partitions 19 and the grilles form passages which are closed except for the slits 12 and the grilles 15 and 16. It is thus seen that there is provided at each slit 12 a complete air blending unit, a plurality of such units being spaced apart and associated with the duct 11 for tempering the air discharged therefrom.

In operation, the dehumidified air is passed into the duct 11 at a static pressure of say 0.6″ of water. The air under pressure passes in high velocity jets through the ejector nozzle slits 12 and discharges into the passage formed between the partitions 18 and the end partitions 20. This ejector action induces the flow of the air recirculated from the car, into the passage between the partitions 18. The recirculated air is mixed in this passage with the chilled dehumidified air and increases its sensible heat. Tests of a structure equivalent to that illustrated herein have shown that the dehumidified air as 40% of the total air can effectively induce 60% of the total air as recirculated air so that there is ample by-pass effect.

It is not desired, of course, that the air from the grille 15 be discharged in a blast into the passenger space, and it is a feature of the embodiment of this invention illustrated by Figs. 1, 2, and 4 that the relative arrangements of the grilles 15 and 16 prevent this. The air discharged from the grilles 15 tends to flow in short-circuit flow into the grilles 16 as indicated by the arrows of Fig. 1. The side currents thus prevent a down blast into the passenger space which instead is cooled by the flow of the cold air particles by gravity into the passenger space, from the air currents directed towards the side of the car. Some air is projected downwardly into the passenger space from the grilles 15 but this air will have been tempered by the by-pass air and it enters the center aisle for aiding in the displacement of the warm air to each side thereof for flow into the grilles 16.

There is not much space in the upper part of a railway passenger car for ducts and air mixing passages, etc., but the available space is sufficient for the installation of apparatus effectively embodying this invention. The ordinary overhead duct now used handles 100% of the air discharged into the passenger space. Since the overhead duct according to this invention handles only 40% of the total air, its size may be correspondingly reduced. Furthermore it is desirable to have higher static air pressures in the duct than have been provided in the past, for ejector action so that the size of the duct may be reduced more than 60% through the movement of the air therethrough at higher pressures.

Fig. 3 illustrates an embodiment of the invention in which outdoor air is blended by ejector action with the dehumidified air. The ventilator 22 admits outdoor air into the clere-story space 23. The air outlet grille 15 contains the deflectors 24 which deflect the air from the grille 15 towards the side of the car for preventing a downblast. The jets discharged from the slits 12 induce the flow of air from the clere-story space 23 into the passage between the partitions 18, the heated outdoor air acting to increase the sensible heat of the dehumidified air. Although in this embodiment there are no recirculated air grilles for the production of overhead transverse air currents, the outdoor air may be expected to have a higher temperature than the recirculated air used in Figs. 1 and 2 so that the air discharged into the passenger space will have a higher temperature so that no objectionable drafts would be produced.

The embodiment of Fig. 4 is similar to that of Figs. 1 and 2 except that it is better adapted for the modern stream-lined cars which have no clere-story space and in which the ceiling is closer to the roof. In this embodiment the duct 11 is illustrated as covered with the insulation 25 for reducing heat exchange losses. The ducts 11 of Figs. 1 and 3 may of course also be so insulated. The outlet grilles 15 are placed below the ceiling 14 and connected to the ceiling by the converging partitions 26 which form therebetween a converging air passage. The converging passage aids in the air inducing action of the jets discharged thereinto, and by locating the grilles 15 below the ceiling 14 more space between the grilles 15 and slits 12 is provided for the induction and mixing effects.

Utilizing this invention a relatively small volume of air may be chilled to a relatively low dew point temperature and mixed with a relatively large volume of warmer air at local discharge points, the low dew point temperature providing for low relative humidities in the passenger space, and the mixing of the warm air providing for the discharge of the air without drafts.

While embodiments of the invention have been described for the purpose of illustration, it should be understood that the invention is not limited to the exact apparatus and arrangements of apparatus illustrated as modifications thereof may be suggested by those skilled in the art without departure from the essence of the invention.

What is claimed is:

1. An air tempering system for a passenger vehicle having a ceiling, comprising a duct for connection to a source of refrigerated air under pressure, said duct being spaced above said ceiling for forming an air space between said duct and ceiling, said ceiling having an air outlet under said duct for supplying air into the passenger space, means forming an ejector connected to said duct for discharging air from said duct in a high velocity jet into said outlet, means forming an air inlet into said space for supplying thereunto, warm air from another source of air, whereby the air through said ejector induces the flow of air through said inlet for mixture with the ejector air prior to discharge through said outlet.

2. An air tempering system for a passenger vehicle having a ceiling, comprising a duct above said ceiling for connection to a source of refrigerated air under pressure, means forming an air outlet through said ceiling into the passenger space of said vehicle, means forming an ejector connecting with said duct for discharging air from said duct in a high velocity jet into said outlet, means forming a recirculated air inlet in said ceiling, and means forming a passage for conveying air from said inlet in contact with the air discharged from said ejector, between said ejector and said outlet whereby the flow of recirculated air from the passenger space through said inlet and passage is induced by the flow of air through said ejector, for mixture with the air from said ejector prior to discharge of same through said outlet into said passenger space.

3. An air tempering system for a passenger vehicle having a ceiling, comprising a duct above said ceiling for connection to a source of refrigerated air under pressure, means forming an air outlet through said ceiling into the passenger space of said vehicle, means forming an ejector connecting with said duct for discharging air from said duct in a high velocity jet into said outlet, means forming recirculated air inlets in said ceiling on opposite sides of said outlet, and means forming passages for conveying air from said inlets in contact with the air discharged from said ejector, between said ejector and said outlet whereby the flow of recirculated air from the passenger space through said inlets and passages is induced by the flow of air through said ejector, for mixture with the air from said ejector prior to discharge of same through said outlet into said passenger space.

4. An air tempering system for a passenger vehicle having a ceiling, comprising a duct extending longitudinally down along the center line of and above said ceiling for connection to a source of refrigerated air under pressure, means forming an air outlet extending along the longitudinal center line of and through said ceiling into the passenger space of said vehicle, means forming an ejector in the center of the lower wall of said duct for discharging air from said duct in a high velocity jet into said outlet, means forming recirculated air inlets in said ceiling on opposite sides of said outlet, and means forming passages for conveying air from said inlets in contact with the air discharged from said ejector, between said ejector and said outlet whereby the flow of recirculated air from the passenger space through said inlets and passages is induced by the flow of air through said ejector, for mixture with the air from said ejector prior to discharge of same through said outlet into said passenger space.

5. An air tempering system for a passenger vehicle having a ceiling, comprising a duct above said ceiling for connection to a source of refrigerated air under pressure, means forming an air outlet through said ceiling into the passenger space of said vehicle, means forming an ejector connecting with said duct for discharging air from said duct in a high velocity jet into said outlet, means forming a recirculated air inlet between said outlet and one of the longitudinal sides of said vehicle, and means forming a passage for conveying air from said inlet in contact with the air discharged from said ejector, between said ejector and said outlet whereby the flow of recirculated air from the passenger space through said inlet and passage is induced by the flow of air through said ejector, for mixture with the air from said ejector prior to discharge of same through said outlet into said passenger space.

6. An air tempering system for a passenger vehicle having a ceiling, comprising a duct above said ceiling for connection to a source of refrigerated air under pressure, means forming an air outlet through said ceiling into the passenger space of said vehicle, means forming an ejector connecting with said duct for discharging air from said duct in a high velocity jet into said outlet, means forming recirculated air inlets on opposite sides of said outlet, and means forming passages for conveying air from said inlets in contact with the air discharged from said ejector, between said ejector and said outlet whereby the flow of recirculated air from the passenger space through said inlets and passages is induced by the flow of air through the ejector, for mixture with the air from said ejector prior to discharge of same through said outlet into said passenger space.

7. An air tempering system for a passenger vehicle having a ceiling, comprising a duct above said ceiling for connection to a source of refrigerated air under pressure, means forming an air outlet through said ceiling into the passenger space of said vehicle, means forming an ejector connecting with said duct for discharging air from said duct in a high velocity jet into said outlet, and means forming an outdoor air passage for conveying outdoor air in contact with the air from said ejector, between said ejector and said outlet whereby the air through said ejector induces the flow of outdoor air through said passage for mixture with the ejector air prior to discharge through said outlet.

8. An air tempering system for a pasenger vehicle having a ceiling, comprising a duct for connection to a source of refrigerated air under pressure, said duct being spaced above said ceiling for forming an air space between said duct and ceiling, said ceiling having an air outlet under said duct for supplying air into the passenger space, means forming an ejector connected to said duct for discharging air from said duct in a high velocity jet into said outlet, means forming an air inlet into said space for supplying thereunto, warm air from another source of air, whereby the air through said ejector induces the flow of air through said inlet for mixture with the ejector air prior to discharge through said outlet, said outlet including oppositely inclined deflectors for deflecting air from said outlet towards the opposite longitudinal sides of said vehicle.

9. An air tempering system for a passenger vehicle having a ceiling, comprising a duct above said ceiling for connection to a source of refrigerated air under pressure, means forming an air outlet through said ceiling into the passenger space of said vehicle, means forming an ejector connecting with said duct for discharging air from said duct in a high velocity jet into said outlet, and means forming an outdoor air passage for conveying outdoor air in contact with the air from said ejector, between said ejector and said outlet whereby the air through said ejector induces the flow of outdoor air through said passage for mixture with the ejector air prior to discharge through said outlet, said outlet including oppositely inclined deflectors for deflecting air from said outlet towards opposite longitudinal sides of said vehicle.

ROBERT T. PALMER.